United States Patent
Uehira et al.

(10) Patent No.: US 7,201,950 B2
(45) Date of Patent: Apr. 10, 2007

(54) OPTICAL COMPENSATORY SHEET, ELLIPTICAL POLARIZING PLATES AND LIQUID-CRYSTAL DISPLAY

(75) Inventors: Shigeki Uehira, Minami-ashigara (JP); Shinichi Morishima, Minami-ashigara (JP); Minoru Uchida, Minami-ashigara (JP)

(73) Assignee: Fuji Photo Film Co., Ltd., Minami-Ashigara-Shi, Kanagawa (JP)

( * ) Notice: Subject to any disclaimer, the term of this patent is extended or adjusted under 35 U.S.C. 154(b) by 256 days.

(21) Appl. No.: 10/798,296

(22) Filed: Mar. 12, 2004

(65) Prior Publication Data

US 2004/0234706 A1 Nov. 25, 2004

(30) Foreign Application Priority Data

Mar. 14, 2003 (JP) .............................. 2003-069254

(51) Int. Cl.
| | |
|---|---|
| G02B 5/30 | (2006.01) |
| C09K 19/54 | (2006.01) |
| C09K 19/52 | (2006.01) |
| C09K 19/62 | (2006.01) |

(52) U.S. Cl. .................. 428/1.1; 428/1.3; 428/1.31; 252/299.01; 252/299.5; 252/299.62

(58) Field of Classification Search ................. 428/1.1, 428/1.3, 1.31; 349/117; 252/299.01, 299.5, 252/299.62
See application file for complete search history.

(56) References Cited

U.S. PATENT DOCUMENTS

| | | | | |
|---|---|---|---|---|
| 5,136,011 A | * | 8/1992 | Barclay et al. ............. | 528/162 |
| 6,380,996 B1 | * | 4/2002 | Yokoyama et al. ......... | 349/117 |
| 6,437,123 B1 | * | 8/2002 | Bock et al. .................. | 544/216 |
| 6,476,892 B2 | * | 11/2002 | Aminaka .................... | 349/117 |
| 6,875,483 B2 | * | 4/2005 | Ichihashi et al. .......... | 428/1.23 |
| 6,890,608 B2 | * | 5/2005 | Morishima et al. ......... | 428/1.3 |
| 2001/0026338 A1 | * | 10/2001 | Aminaka .................... | 349/117 |

* cited by examiner

*Primary Examiner*—Shean C Wu
(74) *Attorney, Agent, or Firm*—Buchanan Ingersoll & Rooney PC

(57) ABSTRACT

A novel optical compensatory sheet is disclosed. The sheet comprises an optically anisotropic layer comprising at least one compound selected from the group represented by Formula (I):

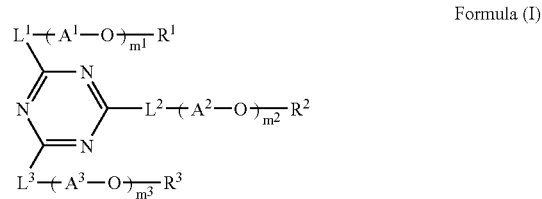

Formula (I)

where $L^1$, $L^2$ and $L^3$ respectively represent a single bond, $NR^a$, where $R^a$ is a hydrogen atom (H), an optionally substituted alkyl or aryl group, oxygen atom (O) or sulfur atom (S); $A^1$, $A^2$ and $A^3$ respectively represent an alkylene group; $R^1$, $R^2$ and $R^3$ respectively represent a substituent group; $m^1$, $m^2$ and $m^3$ respectively represent an integer not less than 0, at least one of $m^1$, $m^2$ and $m^3$ is not 0, when $m^1$ and $m^2$ are 0, $L^3$ represents NH or S; and when $m^1$, $m^2$ and $m^3$ are respectively not less than 2, plural $A^1$, $A^2$ or $A^3$ may be same or different each other.

11 Claims, No Drawings

OPTICAL COMPENSATORY SHEET, ELLIPTICAL POLARIZING PLATES AND LIQUID-CRYSTAL DISPLAY

TECHNICAL FIELD

The present invention relates to novel optical compensatory sheets and elliptical polarizing plates, and liquid-crystal displays employing them.

DESCRIPTION OF RELATED ART

Optical compensatory sheets are employed in a variety of liquid-crystal displays to eliminate image coloration and to broaden the viewing angle. Stretched birefringent films have conventionally been employed as optical compensatory sheets. Further, in recent years, instead of optical compensatory sheets comprised of stretched birefringent films, the use of optical compensatory sheets having an optically anisotropic layer formed of discotic liquid-crystal molecules on a transparent substrate has been proposed.

The optically anisotropic layer is generally prepared by a method comprising coating a discotic liquid-crystal composition comprising discotic liquid-crystal molecules on an alignment layer, aligning the discotic liquid-crystal molecules by heating up to a temperature exceeding the orientation temperature and fixing the aligned liquid crystal molecules. Generally, discotic liquid-crystal molecules are highly birefringent. Further, discotic liquid-crystal molecules have various orientation modes. Thus, the use of discotic liquid-crystal molecules permits the achievement of optical properties that are unachievable in conventional stretched birefringent films.

On the other hand, it is necessary for preparing an optically anisotropic layer having desired optical characteristics to control alignment of discotic liquid crystal molecules in the layer since discotic liquid-crystal molecules have various orientation modes. It is described in JPA No. 1999-352328 (the term "JPA" as used herein means an "unexamined published Japanese patent application") that addition of cellulose esters of low fatty acids and either F-containing surfactants or 1,3,5-triazin based compounds allows discotic liquid-crystal molecules to align in homeotropic alignment state where the mean tilt angle of molecules is not greater than 5°. It is described in JP-A No. 2002-20363 that compounds showing an excluded volume effect are added to optically anisotropic layers in order to control alignments of liquid crystal molecules.

There have been proposed other methods using alignment layers, in other words interface treatments, for controlling alignments of liquid crystal molecules. However, it is difficult to align liquid crystal compounds in mono-domain alignment, in which liquid crystal molecules are uniformly aligned in whole spaces between an alignment layer interface and an air interface by driving force of an alignment layer alone. Some defects such as schlieren defects generate easily in the layers formed of liquid crystal molecules which are aligned by driving force of alignment layer alone. Although shortening time for maturing alignment contributes to raising productivity, it leads to much increased schlieren defects. The optically anisotropic layers having schlieren defects may scatter light, thereby resulting in lowered optical characteristics.

SUMMARY OF THE INVENTION

One object of the present invention is to provide techniques capable of rapidly preparing optically anisotropic layers formed of hybrid aligned liquid crystal molecules without generating much defects such as schlieren defects. Another object of the present invention is to provide optical compensatory sheets having optically anisotropic layers which can be produced rapidly in high productivity. Another object of the present invention is to provide optical compensatory sheets which can contribute to improving the viewing angle of liquid crystal displays (LCD), and to provide LCDs improved in viewing angle.

In one aspect, the present invention provides an optical compensatory sheet comprising a transparent substrate and an optically anisotropic layer comprising at least one compound selected from the group represented by Formula (I):

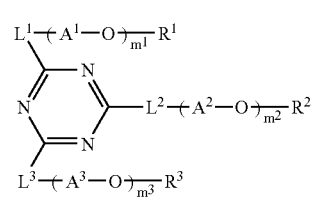

Formula (I)

where $L^1$, $L^2$ and $L^3$ respectively represent a single bond, $NR^a$, where $R^a$ is a hydrogen atom (H), an optionally substituted alkyl or aryl group, oxygen atom (O) or sulfur atom (S); $A^1$, $A^2$ and $A^3$ respectively represent an alkylene group; $R^1$, $R^2$ and $R^3$ respectively represent a substituent group; $m^1$, $m^2$ and $m^3$ respectively represent an integer not less than 0, at least one of $m^1$, $m^2$ and $m^3$ is not 0, when $m^1$ and $m^2$ are 0, $L^3$ represents NH or S; and when $m^1$, $m^2$ and $m^3$ are respectively not less than 2, plural $A^1$, $A^2$ or $A^3$ may be same or different each other.

As embodiments of the present invention, the optical compensatory sheet wherein the optically anisotropic layer further comprises liquid crystal molecules fixed in hybrid alignment; the optical compensatory sheet wherein the liquid crystal molecules are selected from discotic liquid crystals; the optical compensatory sheet wherein $R^1$, $R^2$ and $R^3$ respectively represent a substituted or non-substituted alkyl group or a substituted or non-substituted aryl group; the optical compensatory sheet wherein $R^1$, $R^2$ and $R^3$ respectively represent a substituted or non-substituted alkyl group; the optical compensatory sheet of claim 1, wherein $R^1$, $R^2$ and $R^3$ respectively represent a $C_{1-30}$ substituted or non-substituted alkyl group; the optical compensatory sheet wherein $m^1$, $m^2$ and $m^3$ are not less than 1; the optical compensatory sheet wherein the compound is selected from the group represented by Formula (II):

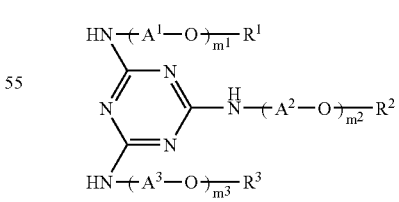

Formula (II)

where $A^1$, $A^2$, $A^3$, $R^1$, $R^2$, $R^3$, $m^1$, $m^2$ and $m^3$ are respectively defined as same as those defined in the foregoing Formula (I); and the optical compensatory wherein the transparent substrate is a polymer film of cellulose acetate; are provided.

In another aspect, the present invention provides an ellipsoidal polarizing plate comprising a transparent substrate, an optically anisotropic layer comprising at least one compound selected from the group represented by the foregoing Formula (I), and a polarizing film disposed nearer to the optically anisotropic layer than to the transparent substrate.

In another aspect, the present invention provides a liquid crystal display comprising a pair of polarizing films, a liquid crystal cell which is disposed between the polarizing films, and at least one optically anisotropic layer comprising at least one compound selected from the group represented by the foregoing Formula (I), which is disposed between the liquid crystal cell and at least one of the pair of polarizing films.

DESCRIPTION OF THE PREFERRED EMBODIMENTS

[Optical Compensatory Sheet]

One embodiment of the present invention relates to an optical compensatory sheet comprising a transparent substrate and at least one optically anisotropic layer formed of a composition comprising at least one liquid crystal compound and at least one compound having a 1,3,5-triazine ring.

The compound having a 1,3,5-triazine ring is desirably selected from the group represented by Formula (I).

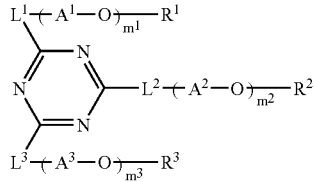

Formula (I)

In the formula, $L^1$, $L^2$ and $L^3$ respectively represent a single bond, $NR^a$, where $R^a$ is a hydrogen atom, an optionally substituted alkyl or aryl group, oxygen atom (O) or sulfur atom (S). They may be same or different each other.

In the formula, $A^1$, $A^2$ and $A^3$ respectively represent an alkylene group. They may be same or different each other.

In the formula, $R^1$, $R^2$ and $R^3$ respectively represent a substituent group. They may be same or different each other.

In the formula, $m^1$, $m^2$ and $m^3$ respectively represent an integer not less than 0, at least one of $m^1$, $m^2$ and $m^3$ is not 0. When $m^1$ and $m^2$ are 0, $L^3$ represents NH, O or S. When $m^1$, $m^2$ and $m^3$ are respectively not less than 2, plural $A^1$, $A^2$ or $A^3$ may be same or different each other.

In the formula, the optionally substituted alkylene group represented by $A^1$, $A^2$ or $A^3$ may be selected from straight or branched and substituted or non-substituted, alkylene groups. $A^1$, $A^2$ or $A^3$ desirably represents a substituted or non-substituted $C_{1-30}$ alkylene group such as —CH$_2$—, —(CH$_2$)$_2$—, —CH$_2$CH(CH$_3$)—, —CH$_2$C(CH$_3$)$_2$— or —(CH$_2$)$_4$—. Among these, —(CH$_2$)$_2$—, —CH$_2$CH(CH$_3$)— or —(CH$_2$)$_4$— is desirable.

In the formula, $m^1$, $m^2$ and $m^3$ respectively represent an integer not less than 0, desirably an integer from 1 to 10, more desirably an integer from 1 to 5. It is noted that all of $m^1$, $m^2$ and $m^3$ are not 0 at the same time, namely at least one of $m^1$, $m^2$ and $m^3$ is not 0.

In the formula, examples of the substituent respectively represented by $R^1$, $R^2$ and $R^3$ include alkyl groups, (desirably $C_{1-30}$ linear or branched and substituted or non-substituted alkyl groups such as methyl, ethyl, isopropyl, t-butyl, n-octyl, dodecyl, eicosyl, 2-chloroethyl, 2-cyanoethyl, 2-ethylhexyl, 2-hexyldecyl, 2-octyldodecyl or 3-(2,4-di-t-amyl phenoxy)propyl); cycloalkyl groups (desirably $C_{3-30}$ substituted or non-substituted mono-cycloalkyl groups such as cyclohexyl, cyclopentyl or 4-n-dodecylcyclohexyl; $C_{5-30}$ substituted or non-substituted bi-cycloalkyl groups such as bicyclo [1,2,2]heptane-2-yl or bicyclo [2,2,2]octane-3-yl; or tri-cycloalkyl groups; more desirably mono-cycloalkyl groups or bi-cycloalkyl groups; and much more desirably mono-cycloalkyl groups); alkenyl groups (desirably $C_{2-30}$ linear or branched and substituted or non-substituted alkenyl groups such as vinyl, allyl, prenyl, geranyloroleyl); cycloalkenyl groups (desirably $C_{3-30}$ substituted or non-substituted mono-cycloalkenyl groups such as 2-cyclopentene-1-yl or 2-cyclohexane-1-yl; $C_{5-20}$ substituted or non-substituted bi-cycloalkenyl groups such as bicyclo [2,2,1] hepto-2-en-1-yl or bicyclo [2,2,2]octo-2-en-4-yl; or tri-cycloalkenyl groups; and more desirably mono-cycloalkenyl groups); alkynyl groups (desirably $C_{2-30}$ linear or branched and substituted or non-substituted alkynyl groups such as ethynyl, propargyl or trimethylsilyl ethynyl); aryl groups (desirably $C_{6-30}$ substituted or non-substituted aryl groups such as phenyl, p-tolyl, naphthyl, m-chlorophenyl, o-hexadecanoyl aminophenyl, o-2-(perfluorohexyl)ethoxyphenyl, o-3-(perfluorohexyl)propyloxyphenyl, o-2-(6H-dodecafluorohexyl)ethoxyphenyl, o-(8H-hexadecafluorooctyl)methoxyphenyl); hetero-ring groups (desirably substituted or non-substituted, saturated or non-saturated, aromatic or non-aromatic, and monocyclic or condensed polycyclic 5 to 7 members hetero-ring groups, more desirably hetero-ring groups formed of atoms selected from the group consisting of carbon, nitrogen, oxygen and sulfur atoms, and having at least one heteroatom selected from the group consisting of nitrogen, oxygen and sulfur atoms; much more desirably $C_{3-30}$ 5 or 6 members hetero-ring groups such as 2-furyl, 2-thienyl, 2-pyridyl, 4-pyridy, 2-pyrimidynyl or 2-benzothiazolyl); alkoxy groups (desirably $C_{1-30}$ substituted or non-substituted alkoxy groups such as methoxy, ethoxy, isopropoxy, t-butoxy, n-octyloxy, 2-methoxy ethoxy, 1H,1H, 9H-hexadecafluoro nonanoxy or 2-perfluorohexyl ethoxy); aryloxy groups (desirably $C_{6-30}$ substituted or non-substituted aryloxy groups such as phenoxy, 2-methyl phenoxy, 2,4-di-t-amyl phenoxy, 4-t-butyl phenoxy, 3-nitro phenoxy, 2-tetradecanoylamino phenoxy, o-2-(perfluorohexyl)ethoxy phenoxy, o-3-(perfluorohexyl)propyloxy phenoxy, o-2-(6H-dodecafluoro hexyl)ethoxy phenoxy or o-(8H-hexadecafluorooctyl)methoxy phenoxy); silyloxy groups (desirably $C_{3-20}$ silyloxy groups such as trimethyl silyloxy or t-butyl dimethyl silyloxy); hetero-ring oxy groups (desirably $C_{2-30}$ substituted or non-substituted hetero-ring oxy groups having one selected from the examples of hetero-ring groups such as 1-phenyl tetrazole-5-oxy or 2-tetrahydro pyranyl oxy); acyloxy groups (desirably formyloxy, $C_{2-30}$ substituted or non-substituted alkylcarbonyl oxy groups or $C_{6-30}$ substitute or non-substituted arylcarbonyl oxy groups, such as formyl oxy, acetyl oxy, pivaloyl oxy, stearoyl oxy, benzoyl oxy or p-methoxy phenylcarbonyl oxy); carbamoyloxy groups (desirably $C_{1-30}$ substituted or non-substituted carbamoyloxy groups such as N,N-dimethyl carbamoyloxy, N,N-diethyl carbamoyloxy, morpholino carbonyloxy, N,N-di-n-octylamino carbonyloxy or N-n-octylcarbamoyloxy); alkoxycarbonyloxy groups (desirably $C_{2-30}$ substituted or non-substituted alkoxycarbonyloxy groups such as methoxy carbonyloxy, ethoxy carbonyloxy, t-butoxy carbonyloxy or n-octyl carbonyloxy); aryloxy carbonyloxy groups (desirably $C_{7-30}$ substituted or non-substituted aryloxy carbonyloxy such as phenoxy carbonyloxy, p-methoxy phenoxy carbonyloxy or p-n-hexadecyloxy phenoxy carbonyloxy); amino groups (desirably amino, $C_{1-30}$ substituted or non-substituted alkylamino groups, $C_{6-30}$ substituted or non-substituted arylamino groups or $C_{0-30}$ hetero-ring amino groups, such as amino, methylamino, dimethylamino, 3-perfluorohexylpropyl amino, anilino, N-methyl-anilino, diphenylamino or N-1,3,5-triazine-2-yl amino); acylamino groups (desirably formyl amino, $C_{1-30}$ substituted or non-substituted alkylcarbonyl amino groups or $C_{6-30}$ substituted or non-substituted arylcarbonyl amino groups, such as formyl amino, acetylamino, pivaloyl amino, lauroyl amino, benzoyl amino or 3,4,5-tri-n-octyloxyphenyl carbonyl amino); aminocarbonyl amino groups (desirably $C_{1-30}$ substituted or non-substituted amino carbonylamino groups such as carbamoyl amino, N,N-dimethylamino carbonylamino, N,N-diethylamino carbonylamino or morpholino carbonylamino); alkoxy carbonylamino groups (desirably $C_{2-30}$ substituted or non-substituted alkoxy carbonylamino groups such as methoxy carbonylamino, ethoxy carbonylamino, t-butoxy carbonylamino, n-octadecyloxy carbonylamino or N-methyl-methoxy carbonylamino); aryloxy carbonylamino groups (desirably $C_{7-30}$ substituted or non-substituted aryloxy carbonylamino groups such as phenoxy carbonylamino, p-chlorophenoxy carbonylamino or m-n-octyloxyphenoxy carbonylamino); sulfamoylamino groups (desirably $C_{0-30}$ substituted or non-substituted sulfamoylamino groups such as sulfamoylamino, N,N-dimethylamino sulfonylamino or N-n-octylamino sulfonylamino); alkyl or aryl sulfonylamino groups (desirably $C_{1-30}$ substitute or non-substituted alkylsulfonylamino groups or $C_{6-30}$ substitute or non-substituted arylsulfonylamino groups, such as methylsulfonylamino, butylsulfonylamino, phenylsulfonylamino 2,3,5-trichlorophenylsulfonylamino or p-methylphenylsulfonylamino); mercapto; alkylthio groups (desirably $C_{1-30}$ substitute or non-substituted alkylthio groups such as methylthio, ethylthio or n-hexadecylthio); arylthio groups (desirably $C_{6-30}$ substituted or non-substituted arylthio groups such as phenylthio, p-chlorophenylthio or m-methoxyphenylthio); hetero-ring thio groups (desirably $C_{2-30}$ substituted or non-substituted hetero-ring thio groups having a hetero-ring selected from the examples of hetero-ring groups such as 2-benzothiazolylthio or 1-phenyltetrazole-5-yl thio); sulfamoyl groups (desirably $C_{0-30}$ substituted or non-substituted sulfamoyl groups such as N-ethylsulfamoyl, N-(3-dodecyloxypropyl)sulfamoyl, N,N-dimethylsulfamoyl, N-acetylsulfamoyl, N-benzoylsulfamoyl or N-(N'-phenylcarbamoyl) sulfamoyl); sulfo; alkyl or aryl sulfinyl groups (desirably $C_{1-30}$ substituted or non-substituted alkylsulfinyl or $C_{6-30}$ substituted or non-substituted arylsulfinyl groups, such as methylsulfinyl, ethylsulfinyl phenylsulfinyl or p-methylphenylsulfinyl); alkyl or aryl sulfonyl groups (desirably $C_{1-30}$ substituted or non-substituted alkylsulfonyl groups or $C_{6-30}$ substituted or non-substituted arylsulfonyl groups such as methylsulfonyl, ethylsulfonyl, phenylsulfonyl or p-methylphenylsulfonyl); acyl groups (desirably formyl, $C_{2-30}$ substituted or non-substituted alkylcarbonyl groups or $C_{7-30}$ substituted or non-substituted arylcarbonyl groups such as acetyl, pivaloyl, 2-chloroacetyl, stearoyl, benzoyl or p-n-octyloxyphenylcarbonyl); aryloxycarbonyl groups (desirably $C_{7-30}$ substituted or non-substituted aryloxycarbonyl groups such as phenoxycarbonyl, o-chlorophenoxycarbonyl, m-nitrophenoxycarbonyl or p-t-butylphenoxycarbonyl); halogen atoms such as chlorine, bromine or iodine atom; alkoxycarbonyl groups (desirably $C_{2-30}$ substituted or non-substituted alkoxycarbonyl groups such as methoxycarbonyl, ethoxycarbonyl, t-butoxycarbonyl or n-octadecyloxycarbonyl); carbamoyl groups (desirably $C_{1-30}$ substituted or non-substituted carbamoyl groups such as carbamoyl, N-methylcarbamoyl, N,N-dimethylcarbamoyl, N,N-di-n-octylcarbamoyl or N-(methylsulfonyl) carbamoyl); aryl or hetero-ring azo groups (desirably $C_{6-30}$ substituted or non-substituted arylazo groups or $C_{3-30}$ sub-stituted or non-substituted hetero-ring azo groups having a hetero-ring selected form the examples of hetero-ring groups, such as phenyl azo, p-chlorophenyl azo or 5-ethylthio-1,3,4-thiadiazole-2-yl azo); imido groups (desirably $C_{2-30}$ substituted or non-substituted imido groups such as N-succinimido or N-phthalic imido); phosphino groups (desirably $C_{2-30}$ substituted or non-substituted phosphino groups such as dimethyl phosphino, Diphenyl phosphino or methylphenoxy phosphino); phosphinyl groups (desirably $C_{2-30}$ substituted or non-substituted phosphinyl groups such as phosphinyl, dioctyloxy phosphinyl or diethoxy phosphinyl); phosphinyloxy groups (desirably $C_{2-30}$ substituted or non-substituted phosphinyloxy groups such as diphenoxy phosphinyloxy or dioctyloxy phosphinyloxy); phosphinylamino groups (desirably $C_{2-30}$ substituted or non-substituted phosphinylamino groups such as dimethoxy phosphinylamino or dimethylamino phosphinylamino); silyl groups (desirably $C_{3-30}$ substituted or non-substituted silyl groups such as trimethyl silyl, t-butyl silyl or phenyldimethyl silyl); cyano, hydroxy, nitro or carboxyl.

These substituent groups may be substituted with at least one substituent group selected from the above examples of the substituent groups represented by $R^1$, $R^2$ or $R^3$. When there are two substituent groups, they may be same or different each other, and if it is possible, they may bind each other to form a ring.

$R^1$, $R^2$ or $R^3$ is desirably a substitutent selected from the group consisting of substituted or non-substituted alkyl groups and substituted or non-substituted aryl groups. The substituent groups may be selected from the examples of the substituent groups represented by $R^1$, $R^2$ or $R^3$.

The compound represented by the Formula (I) is desirably selected from the group represented by Formula (II).

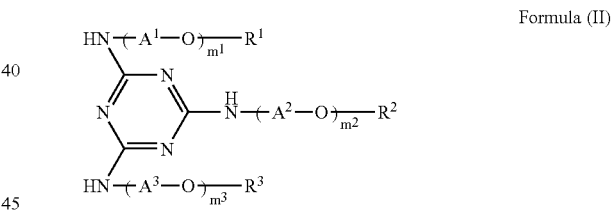

Formula (II)

In the Formula (II), $A^1$, $A^2$, $A^3$, $R^1$, $R^2$, $R^3$, $m^1$, $m^2$ and $m^3$ are respectively defined as same as those defined in the Formula (I). And the preferred scopes of these are respectively identical to those in the Formula (I).

The compound represented by the Formula (I) may have at polymerizable group as a substituent for fixing themselves in alignment state. Examples of the polymerizable groups include vinyl groups, vinyloxy groups, acryloyl groups and methacryloyl groups.

It is noted that the term of "comprising a compound" is used not only for an embodiment comprising a compound as it is, but also, for any embodiments comprising an oligomer or a polymer formed of the compound alone or formed of the compound and another compound when the compound having a polymerizable group is used.

Examples of the compound represented by the Formula (I) are shown below, but the examples of the compound which can be used in the present invention are not limited to these.

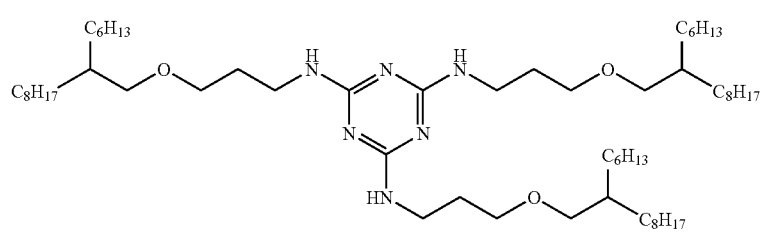
(1)
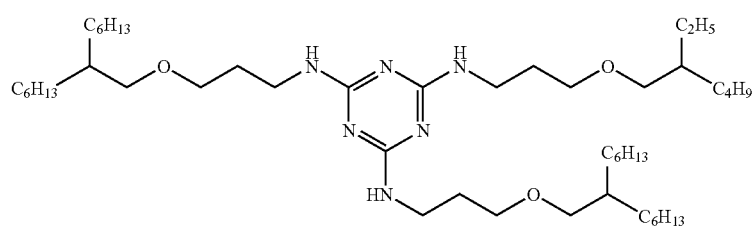
(2)
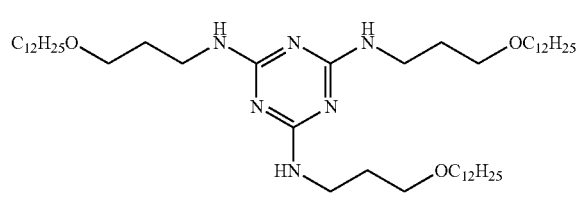
(3)
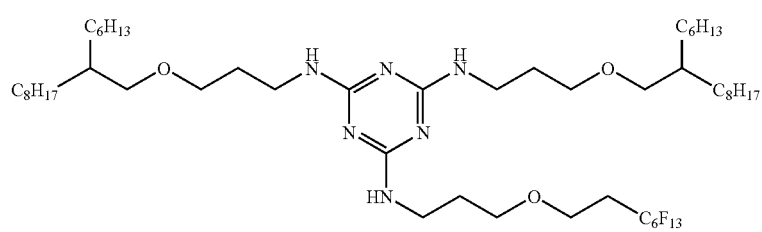
(4)
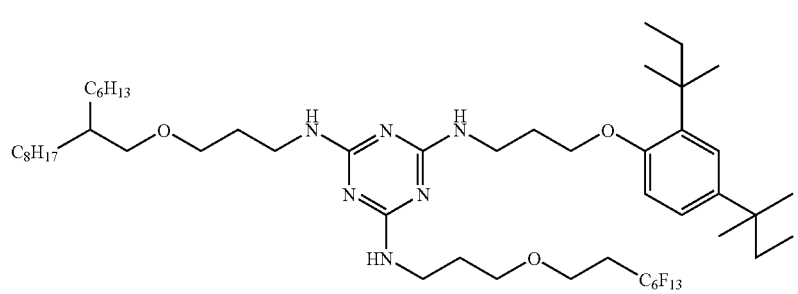
(5)
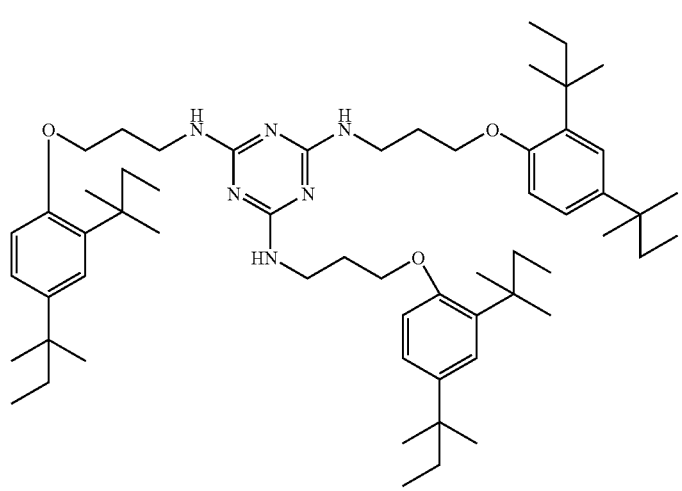
(6)

-continued
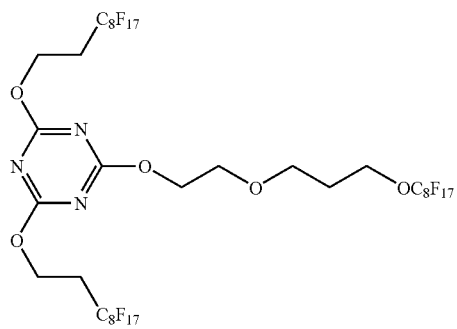
(7)
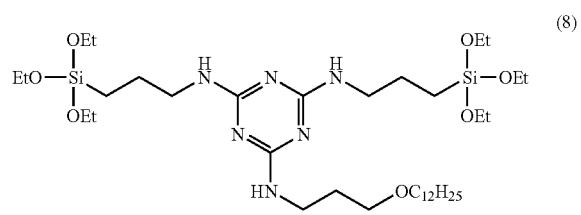
(8)
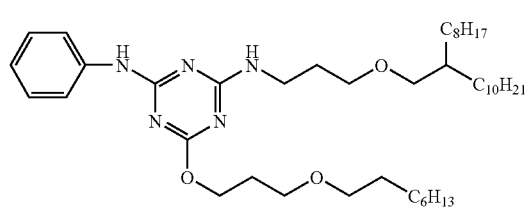
(9)
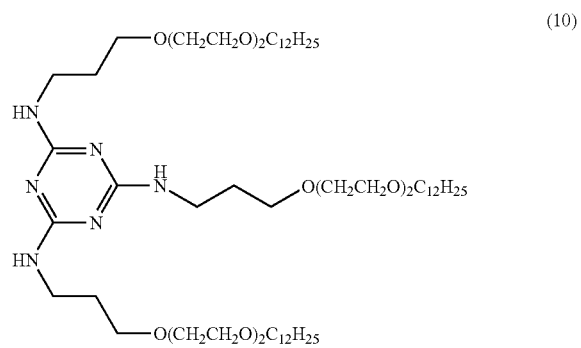
(10)
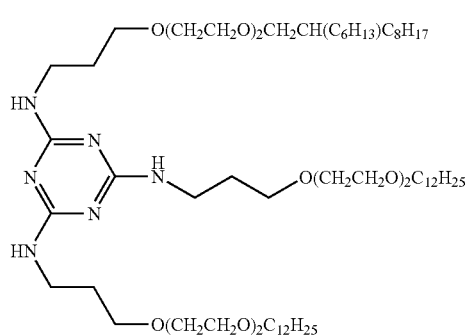
(11)
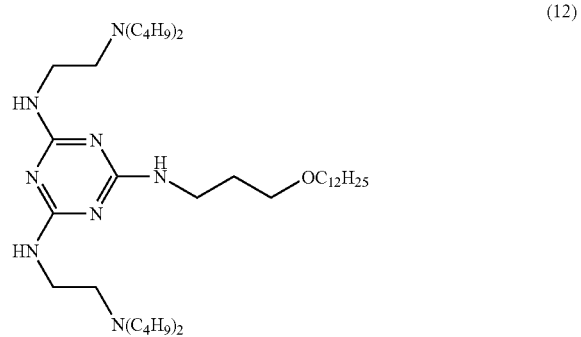
(12)
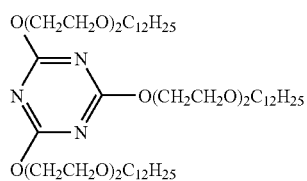
(13)
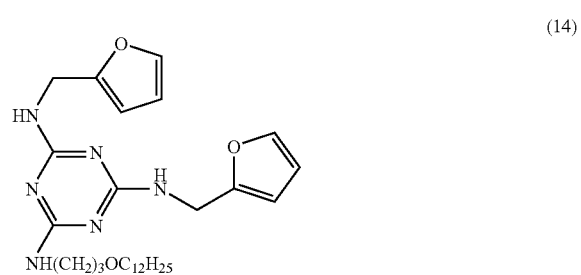
(14)
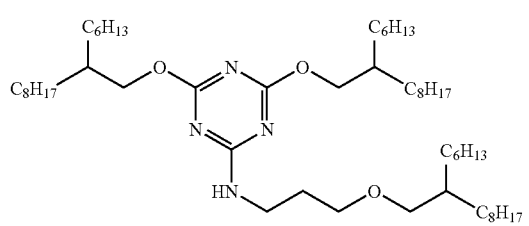
(15)
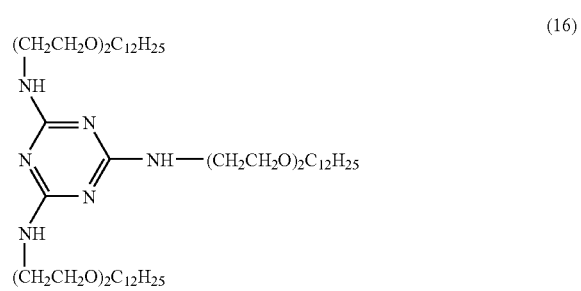
(16)

-continued
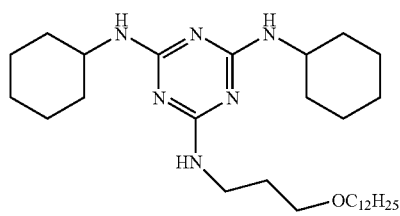 (17)
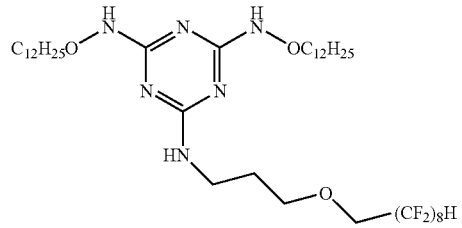 (18)
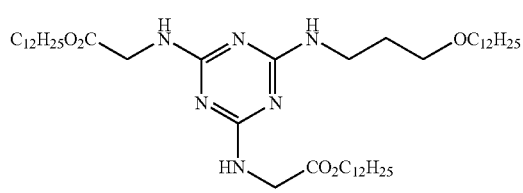 (19)
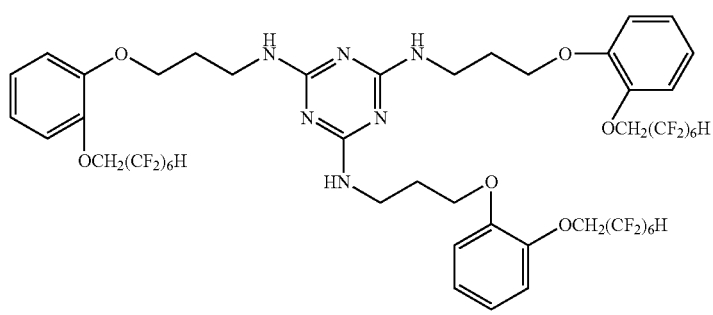 (20)
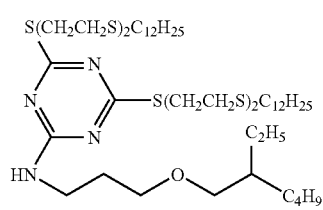 (21)
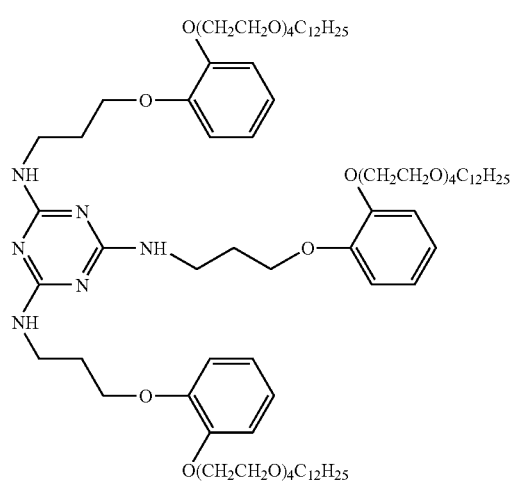 (22)
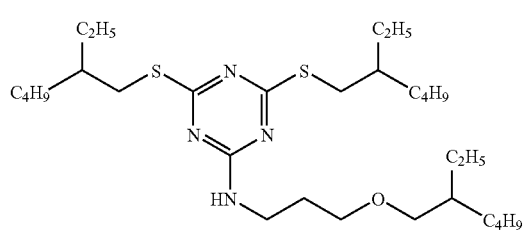 (23)
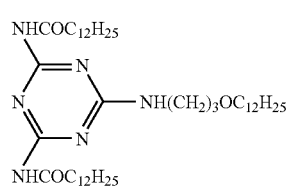 (24)

(25)
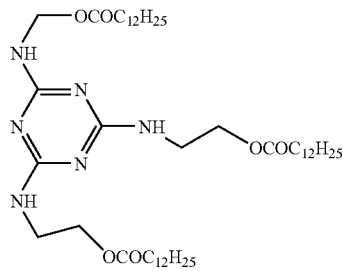
(26)
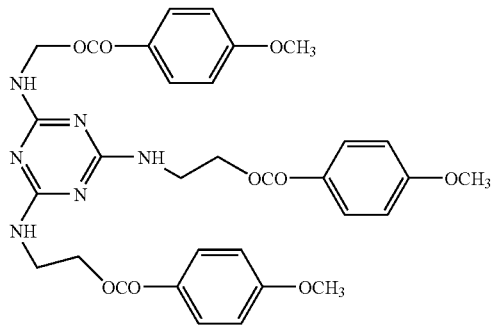
(27)
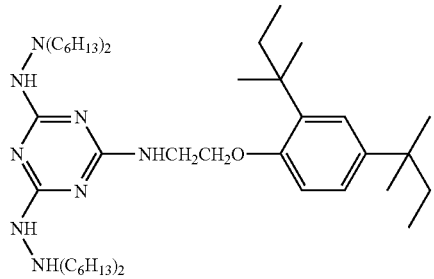
(28)
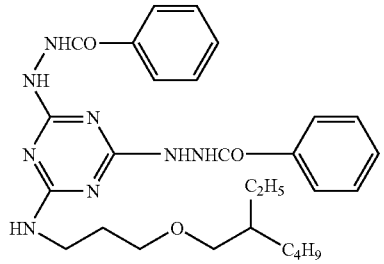
(29)
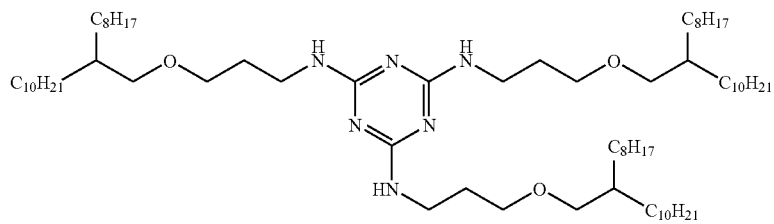
(30)
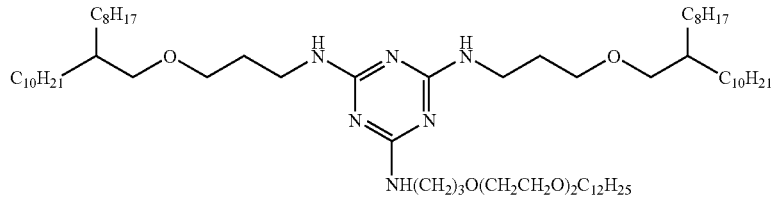
(31)
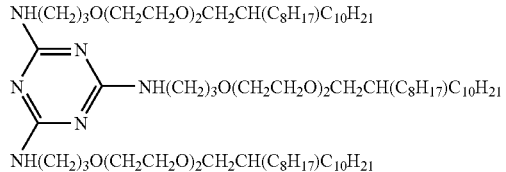
(32)
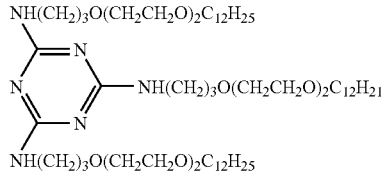
(33)
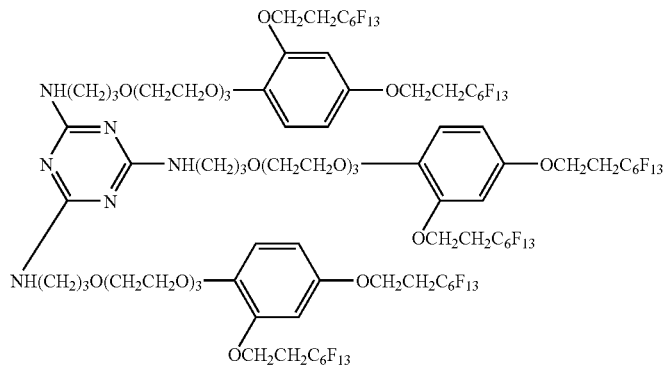

-continued
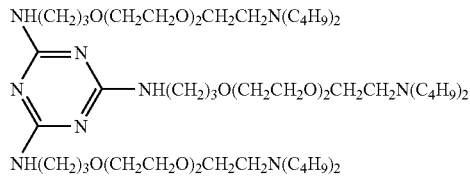(34)
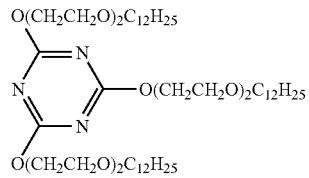(35)
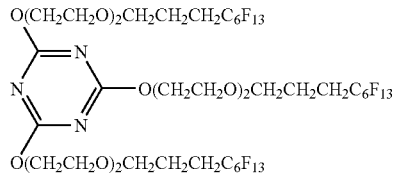(36)
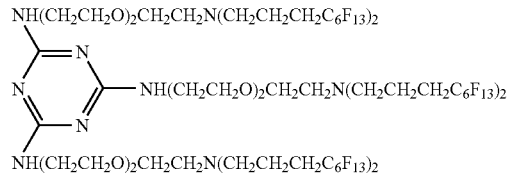(37)
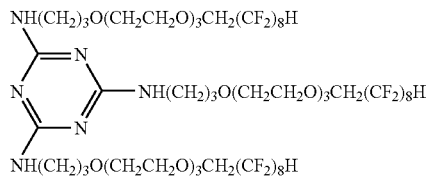(38)
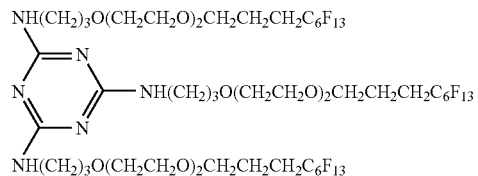(39)
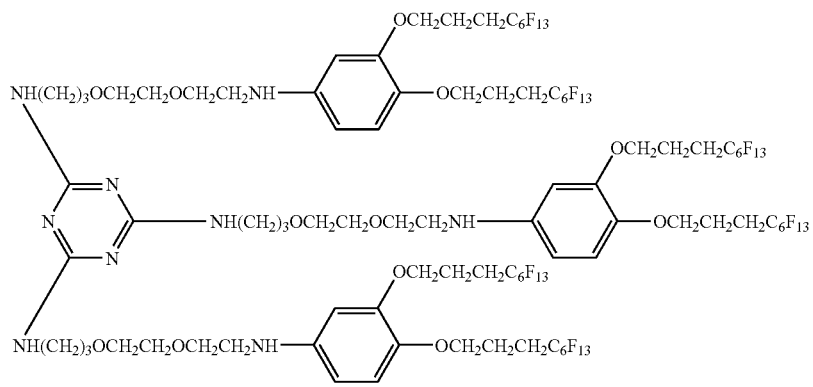(40)
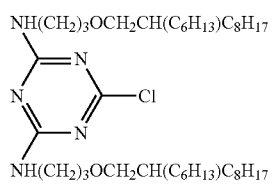(41)
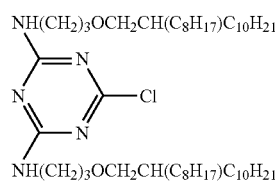(42)
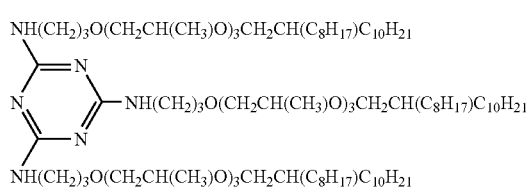(43)
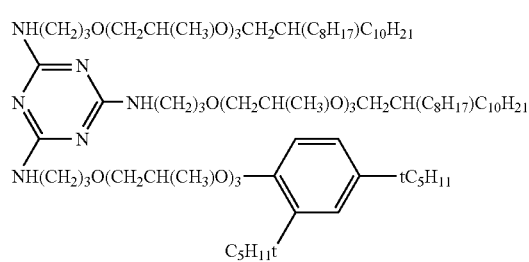(44)
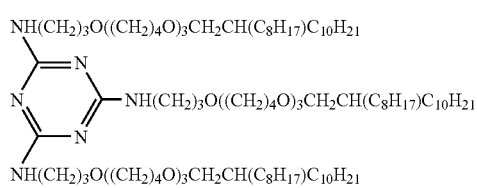(45)
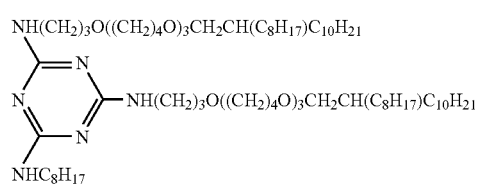(46)

In the present invention, one 1,3,5-triazine compound may be used, or two or more 1,3,5-triazine compounds may be used. The amount of the 1,3,5-triazine compound is desirably from 0.01 to 20 wt %, more desirably from 0.05 to 10 wt %, and much more desirably from 0.05 to 5 wt % with respect to the weight of the liquid crystal compound.

According to the present invention, examples of the liquid crystal compound, which can be employed in an optically anisotropic layer, include rod-like liquid crystal compounds and discotic liquid crystal compounds. The liquid crystal compound may be selected from high-molecular weight or low-molecular weight liquid crystals. The liquid crystal compound is not required to have a liquid-crystalinity after forming the optically anisotropic layer, in which the molecules of the low-molecular-weight liquid crystal compound are crosslinked.

The liquid crystal compound is desirably selected from discotic liquid crystal compounds.

Examples of the rod-like liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention. Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142th committee of Japan Society for the Promotion of Science. The rod-like crystal compounds desirably have a birefringence index of 0.001 to 0.7. The rod-like crystal compounds desirably have one or more polymerizable groups for fixing themselves in an alignment state. Examples of the rod-like crystal compounds are described from on line 7 of p. 50 to on last line of p.57 in WO01/88574A1.

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al. Examples of the discotic liquid crystal compounds also include compounds having a discotic core and substituents, such as alkyl or alkoxy straight chains or substituted benzoyloxy groups, radiating from the core. Such compounds exhibit liquid crystallinity.

The Liquid crystal compounds employed in preparing optically anisotropic layers are not required to maintain liquid crystallinity after contained in the optically anisotropic layers. For example, when a low-molecular-weight liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid crystal compounds are described in JPA No. 1996-50206. The polymerization of discotic liquid-crystal compounds is described in JP-A No. 1996-27284.

One example of the processes for fixing discotic liquid crystal molecules by polymerization is a process comprising carrying out polymerization of discotic liquid crystal molecules, having a discotic core and one or more polymerizable groups as substituents for the core, after aligning the liquid crystal molecules in hybrid alignment. It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during polymerization reaction. Accordingly, the discotic liquid-crystal molecules desirably have a linking group between the disk-shaped core and the polymerizable group. That is, the discotic liquid-crystal compound is desirably selected from the group denoted by Formula (IV) below.

$$D(\text{-}L\text{-}P)_n$$

In the formula, D denotes the disk-shaped core, L denotes a divalent linking group, P denotes a polymerizable group, and n denotes an integer from 2 to 12. Examples of the discotic liquid crystal compounds denoted by the Formula (IV) are described from on line 6 of page 58 to on line 8 of page 65 in WO01/99574A1.

Some additives such as plasticizers, surfactants or polymerizable monomers may be used with discotic liquid crystal compounds. Any such additives can be used with the discotic liquid crystal compound as far as they has compatibility for the discotic liquid crystal compound and do not contribute to inhibition of alignment of the discotic liquid crystal compound. One or more polymerizable monomer such as a compound having a vinyl group, a vinyloxy group, an acryloyl group or a methacryloyl group, may be desirably used with liquid crystal compounds. The amount of the additive is desirably from 1 to 50 wt %, and from 5 to 30 wt %, with respect to the weight of liquid crystal compound.

When a polymerizable monomer having not less than two reactive functional groups is used with the liquid crystal compound, the adhesion property of the optically anisotropic layer for a layer, such as an alignment layer, that is disposed under the optically anisotropic layer.

One or more polymers may be used with discotic liquid crystal compounds. Any polymers can be used with the discotic liquid crystal compound as far as they have compatibility for the discotic liquid crystal compound and do not contribute to inhibition of alignment of the discotic liquid crystal compound. Examples of the polymer include cellulose esters. Preferred examples of cellulose esters include cellulose acetate, cellulose acetate propionate, hydroxypropyl cellulose and cellulose acetate butyrate. So as not to inhibit alignment of discotic liquid crystal, such polymers may be generally added by an amount from 0.1 to 10 wt %, desirably by an amount from 0.1 to 8 wt %, and much more desirably by an amount from 0.1 to 5 wt %, with respect to the weight of the liquid crystal.

According to the present invention, after being aligned in a hybrid alignment state, the liquid crystal molecules are desirably fixed in the state. Fixing is desirably carried out by polymerization. Examples of polymerization reactions which can be used in the present invention include thermal polymerization reactions employing thermal polymerization initiators and photo-polymerization reactions employing photo-polymerization initiators. Photo-polymerization reactions are preferred.

Examples of photo-polymerization initiators are alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimmers and p-aminophenyl ketones (described in U.S. Pat. No. 3,549,367), acridine and phenazine compounds (described in JP-A No. 1985-105667 and U.S. Pat. No. 4,239,850), and oxadiazole compounds (described in U.S. Pat. No. 4,212,970).

The amount of photo-polymerization initiator employed is desirably from 0.01 to 20 wt %, and more desirably from 0.5 to 5 wt % of the weight of the solid portion of the coating liquid. Irradiation for polymerization of discotic liquid-crystal molecules is desirably conducted with ultraviolet radiation. The irradiation energy is desirably within a range from 20 mJ/cm$^2$ to 50 J/cm$^2$, more desirably from 20 to 5000 mJ/cm$^2$, and much more desirably from 100 to 800 mJ/cm$^2$. Irradiation may be conducted under heated conditions to promote the photo-polymerization reaction.

The optically anisotropic layer of the optical compensatory sheet of the present invention may be prepared by applying a coating solution, which can be prepared by dissolving at least one liquid crystal compound, at least one 1,3,5-triazine compound selected from the group represented by the Formula (I) and, if necessary, at least one additive in a solvent, to a surface of a transparent substrate. The solvent, which can be used in preparation of the coating solution include, is desirably selected from organic solvents. Examples of the organic solvent include amides such as N,N-dimethylformamide, sulfoxides such as dimethyl sulfoxide, heterocyclic compounds such as pyridine, hydrocarbons such as benzene or hexane, alkyl halides such as chloroform or dichloromethane, esters such as methyl acetate or butyl acetate, ketones such as acetone or methylethyl ketone; and ethers such as tetrahydrofuran and 1,2-dimethoxyethane. Alkyl halides and ketones are preferred. One or more kinds of solvents may be used for preparing the coating solution.

The coating solution may be applied by known techniques (e.g., wire bar coating, extrusion coating, direct gravure coating, reverse gravure coating and die coating). The coating solution desirably contains a liquid crystal compound in an amount from 10 to 50 wt %, and more desirably from 20 to 40 wt %.

According to the present invention, the optically anisotropic layer desirably has a thickness of 0.1 to 20 micrometers, preferably of 0.5 to 15 micrometers, and more preferably of 1 to 10 micrometers.

For aligning (desirably hybrid-aligning) liquid crystal molecules in the optically anisotropic layer, an alignment layer is desirably used. The alignment layer is desirably produced by rubbing a layer formed of organic material (preferably a polymer). Polyvinyl alcohols are desirable as material for an alignment layer, and among these, modified polyvinyl alcohols, having a hydrophobic group, are more desirable. Alignment layers which are described from line 24 on page 43 to line 8 on page 49 of WO01/88574A1 may be applied to the present invention.

One embodiment of the present invention relates to an optical compensatory sheet comprising a transparent substrate and an optically anisotropic layer thereon. An alignment layer may be disposed between the optically anisotropic layer and the support. The optical compensatory sheet of the present invention can be produced in the manner that the optically anisotropic layer is formed on an alignment layer once, and then transferred from on the alignment layer onto a surface of other member such as a polarizing film. The optical compensatory sheet may further comprise a matte layer (a back layer) on the side opposite to the optically anisotropic layer, or further comprise a protective layer on or above the optically anisotropic layer.

The transparent substrate which can be employed in the present invention desirably has a light transmittance greater than or equal to 80 percent. The transparent substrate is desirably selected from polymer films. Examples of the polymer film include films of cellulose esters such as cellulose di-acetate or cellulose triacetate, norbornene based films and poly-methylmethacrylate based films. Commercially available polymer films (for example "ARTON" or "ZEONEX" as a norbornene based film) may be used as a transparent substrate. The transparent substrate is desirably selected from films of cellulose esters, and more desirably selected from films of cellulose short-chain fatty acid esters. The term of "short-chain fatty acid" is used for any fatty acids having six or less than six carbon atoms. The carbon atom numbers of the fatty acid is desirably 2 (for example cellulose acetate), 3 (for example cellulose propionate) or 4 (for example cellulose butyrate). Cellulose triacetate is specifically desirable. Mixed fatty acid esters such as cellulose acetate propionate or cellulose acetate butyrate may be used. The films formed of the polymers, which are commonly known as easy to develop birefringence, such as polycarbonates or polysulfones, may be also used after being modified by the process described in WO00/26705 thereby to reduce the development of birefringence.

Polymer films of cellulose acetates having an acetylation rate from 55.0 to 62.5%, preferably from 57.0 to 62.0%, are desirably employed in the present invention as a transparent substrate. An acetylation rate means an amount of acetic acid bonding to cellulose per unit weight of cellulose. The acetylation rate can be measured according to the measurement and calculation of acetylation degree of ASTM:D-817-91 (tests of cellulose acetates and the like). The Viscosity-average degree of polymerization (DP) of the cellulose acetate is desirably not lower than 250, and more desirably not lower than 290. The Mw/Mn value (Mw is a weight-average molecular weight, and Mn is a number-average molecular weight) of the cellulose ester obtained by gel permeation chromatography desirably have a narrow distribution. In particular, the Mn/Mw is desirably from 1.0 to 1.7, preferably from 1.3 to 1.65 and more preferably from 1.4 to 1.6.

Generally, hydroxys of 2-, 3- and 6-positions in cellulose are not equally substituted in one third of the substituted degree in whole, and the substituted degree of hydroxy of 6-position tends to be lower than others. According to the present invention, the 6-position hydroxy is desirably higher than 2- and 3-positions. The 6-position is desirably substituted with an acyl group at from 30 to 40%, preferably not lower than 31%, more preferably not lower than 32%, of the substituted degree in whole. The substituted degree of the 6-position is desirably not lower than 0.88. The hydroxy of the 6-position may be substituted with an acyl group, other than acetyl, having not less than 3 carbon atoms such as propionyl, butyryl, valeryl, benzoyl and acryloyl. The substituted degree of each position can be obtained by NMR measurement. The cellulose esters having a high substituted degree can be prepared according to the methods described as "Preparation Example 1" in columns 0043 to 0044, as "Preparation Example 2" in columns 0048 to 0049, and "Preparation Example 3" in columns 0051 to 0052 of JPA No. 1999-5851.

Aromatic compounds having two ore more aromatic rings may be used to control retardations of the polymer films, especially cellulose acetate films. The amount of the aromatic compound is preferably 0.01 to 20 wt %, more preferably 0.05 to 15 wt %, and much more preferably 0.1 to 10 wt %, with respect to weight of cellulose acetate. One or more kinds of the aromatic compounds may be used.

The term of "aromatic ring" is used as a meaning including not only aromatic hydrocarbon rings but also aromatic hetero rings.

The aromatic hydrocarbon ring is desirably 6-membered, namely benzene.

In general, aromatic hetero rings belong to unsaturated hetero rings. The aromatic hetero ring is desirably 5-, 6- or 7-membered, and preferably 5- or 6-membered. In general, aromatic hetero rings have the maximum number of double bonds. Hetero atoms included in the aromatic hetero rings are preferably nitrogen, oxygen or sulfur, and more preferably nitrogen. Examples of the aromatic hetero rings include furan, thiophene, pyrrole, oxazole, isoxazole, thiazole, isothiazole, imidazole, pyrazole, furazan, triazole, pyrane, pyridine, pyridazine, pyrimidine, pyrazine and 1,3,5-triazine.

The aromatic ring is desirably benzene, furan, thiophene, pyrrole, oxazole, thiazole, imidazole, triazole, pyridine, pyrimidine, pyrazine or 1,3,5-triazine, and more desirably benzene or 1,3,5-triazine.

The aromatic ring compound is especially desirably selected from compounds having at least one 1,3,5-triazine ring. The compound having at least one 1,3,5-triazine ring may be selected from the group represented by the Formula (I).

The number of aromatic rings included in the aromatic compound is desirably from 2 to 20, preferably from 2 to 12, more preferably from 2 to 8, and much more preferably from 2 to 6.

Bonding manners between two aromatic rings may be classified into three groups, (a) condensed each other, (b) bonded each other with a single bond and (c) bonded each other with a linking group. The aromatic compounds including two aromatic rings bonded by (a), (b) or (c) manners can be employed. The aromatic compounds contributing to increase of retardation are disclosed in WO01/88574A1, WO00/2619A1, JPA No. 2000-111914, JPA No. 2000-275434 and JPA No. 2002-363343.

The cellulose acetate film that can be employed in the present invention as a transparent substrate are desirably prepared according to solvent casting method with a prepared solution (dope) of cellulose acetate. The aromatic compound is desirably added to the dope.

According to the solvent casting method, the dope is cast on a drum or band and dried on it to form a film. The solid content of the dope before casting is desirably from 18 to 35%. The surface of the band and drum are desirably applied mirror finish treatment. Casting processes and drying processes are described in U.S. Pat. Nos. 2,336,310, 2,367,603, 2,492,078, 2,492,977, 2,492,978, 2,607,704, 2,739,069 and 2,739,070; G.B. patents No. 640731 and 736892; JPB No. 1970-4554 (the term "JPB" as used herein means an "examined published Japanese patent application") and No. 1974-5614; and JPA No. 1985-176834, No. 1985-203430 and No. 1987-115035.

The dope is desirably cast on the drum or band whose surface temperature is not higher than 10 degrees Celsius. After casting, the dope may be winded for not shorter than 2 seconds and dried. The solvent remained in the dope may be evaporated subsequently with hot-air whose temperature is changed stepwise from 100 to 160 degrees Celsius, after peeling the polymer film from the band or drum. The method is described in JPB No. 1993-17844. According to the method, it is possible to shorten the time from a casting step to a peeling step. In order to carry out the method, the dope is required to set to gel at the surface temperature on the drum or band for casting.

The film may be prepared by casting a prepared cellulose acetate solution (dope) to form two or more layers. The dope is cast on a drum or band and dried on it to form a film. The solid content of the dope before casting is desirably from 10 to 40%. The surface of the band and drum are desirably applied mirror finish treatment.

Two or more dopes may be respectively cast on a drum or band from each of two or more casting outlets which are placed at some spaces each other along the moving direction of the drum or band. The two ore more layers of the dopes may be stacked to form a film. The methods described in JPA No. 1986-158414, JPA No. 1989-122419, JPA No. 1993-198285 and the like may be used. The dope may be cast on a band or drum from two casting outlets to form a film. The methods described in JPB No. 1985-27562, JPA No. 1986-94724, No. 1986-947245, No. 1986-104813, No. 1986-158413, No. 1994-134933 and the like may be used. The casting method described in JPA 1981-162617 may be used. According to the method, both of a high viscosity dope and a low viscosity dope are cast at once, so as that the flow of the high viscosity dope wrapped with the low viscosity dope, may be used.

Stretching treatment of the cellulose acetate film may be carried out in order to control its retardations. The stretch ratio is desirably from 3 to 100%. The cellulose acetate film is desirably stretched by tenders. For controlling the slow axis of the film to high accuracy, the deference in velocities, departure times and the like between of the left and right tenter clips are desirably as small as possible.

Plasticizes may be added to the cellulose acetate films in order to improve the mechanical properties of the films and the drying speed. Examples of the plasticizers include phosphate esters and carboxylic acid esters. Examples of the phosphate esters include triphenylphosphate (TPP) and tricresylphosphate (TCP). Typical carboxylic acid esters are phthalates and citrates. Examples of phthalates include dimethyl phthalate (DMP), diethyl phthalate (DEP), dibutyl phthalate (DBP), dioctyl phthalate (DOP), diphenyl phthalate (DPP) and dietylhexyl phthalate (DEHP). Examples of citrates include o-acetyl citrate triethyl (OACTE) and o-acetyl citrate tributyl (OACTB). Examples of other carboxylic acid esters include butyl oleate, methyl acetyl ricinate, dibutyl sebacate and various trimellitic acid esters. A phthalate based plasticizer such as DMP, DEP, DBP, DOP, DPP or DEHP is desirably employed in the film, and DEP or DPP is more desirably employed. The amount of the plasticizer is desirably from 0.1 to 25 wt %, preferably from 1 to 20, and more preferably from 3 to 15 wt %, with respect to the weight of cellulose acetate.

Anti-degradation agents such as antioxidants, decomposers of peroxides, inhibitors of radicals, in-activators of metals, trapping agents of acids or amines, and UV ray protective agents, may be added to the cellulose acetate film. The antioxidants are described in JPA No. 1991-199201, No. 1993-1907073, No 1993-194789, No. 1993-271471, No.

1994-107854 and the like. The amount of the anti-degradation agents in the dope is desirably from 0.01 to 1 wt %, and preferably from 0.01 to 0.2 wt %. When the amount is smaller than 0.01 wt %, the effect of the agent can hardly be recognized. On the other hand, when the amount is larger than 1 wt %, the agent sometimes bleeds out from the film surface. The preferred example of the anti-degradation agent is butylated hydroxy toluene. UV ray protective agents are described in JPA No. 1995-11056.

The polymer film is preferably subjected to surface treatment. Examples of surface treatments include corona discharge treatment, glow discharge treatment, flame treatment, acid treatment, alkali treatment and UV irradiation treatment. The polymer film may have an under coating layer as disclosed in JPA 1995-333433.

From the viewpoint of planarity of the film, the surface treatment is desirably carried out at a temperature not greater than Tg (glass transition temperature) of the polymer, and in practice, desirably at a temperature not greater than 150 degrees Celsius.

From the view point of adhesiveness to a polarizer film, the cellulose acetate film is desirably subjected to acid treatment or alkali treatment, so as that the cellulose acetate of the film is saponified.

The surface energy of the polymer film is preferably 55 mN/m or more, and more preferably 60 to 75 mN/m.

Next, alkali saponification of the film will be described specifically.

The alkali saponification is desirably carried out by a cycle steps comprising soaking a surface or a film in an alkali solution, neutralizing it with an acidic solution, rinsing it in water and then drying it.

The alkali solution that can be employed in the saponification may be a potassium hydrate or sodium hydrate solution. The concentration of the alkali solution is desirably from 0.1 to 3.0 N, and preferably from 0.5 to 2.0 N. The temperature of the alkali solution is desirably from room temperature to 90 degrees Celsius, and preferably from 40 to 70 degrees Celsius.

A surface energy of a solid may be calculated by a contact angle method, a heat of wetting method or an adsorption method, as described in "Bases and Applications of Wettability (Nure No Kiso to ouyou)" published at Dec. 10, 1989 by SIPEC Corporation (former Realize Corporation). A contact angle method is proper for the cellulose acetate film. Specifically, a surface energy of the cellulose acetate film can be calculated by a contact angle method with two contact angles of droplets of which surface energies are respectively known. A contact angle of a droplet on the polymer film is defined as an angle between the polymer film surface and a tangent line to the surface curve of the droplet, which is drawn at an intersection point of the droplet surface and the polymer film surface. There are two angles between the polymer film surface and such tangent line, however, a contact angle is an angle at the side containing the droplet.

The cellulose acetate film has, in general, a thickness from 5 to 500 micrometers, desirably from 20 to 250 micrometers, preferably from 30 to 180 micrometers, and more preferably from 30 to 110 micrometers.

The optical compensatory sheet of the present invention may be combined with a polarizing film to form an elliptical polarizing plate. It may also be combined with a polarizing film and used to broaden the viewing angle in a transmitting liquid-crystal display.

The retardation value of the polymer film may be adjusted within a range from 20 to 70 nm.

Elliptical polarizing plates and liquid-crystal devices employing the optical compensatory sheet of the present invention are described below.

[Elliptical Polarizing Plates]

The optical compensatory sheet of the present invention may be laminated with a polarizing film to produce an elliptical polarizing plate. The use of the optical compensatory sheet of the present invention provides an elliptical polarizing plate capable of broadening the viewing angle of a liquid-crystal display.

Iodine-based polarizing films, dye-based polarizing films employing a dichroic dye, or polyene-based polarizing films may be used as a polarizing film. Iodine-based polarizing films and dye-based polarizing films can generally be formed of polyvinyl alcohol-based films. The polarizing axis of the polarizing film corresponds to a direction normal to the stretching direction of the film.

The polarizing film is disposed on the optically anisotropic layer side of the above-described optical compensatory sheet. A transparent protective film is desirably formed on the side opposite to the side of the optical compensatory sheet on which the polarizing film has been disposed. The transparent protective film desirably has optical transmittance of greater than or equal to 80 percent. Generally, a cellulose ester film, preferably a triacetyl cellulose film, is employed as the transparent protective film. The cellulose ester film is desirably formed by the solvent casting method. The transparent protective film is desirably 20 to 500 micrometers, preferably 50 to 200 micrometers, in thickness.

[The Liquid-crystal Display]

The use of an optical compensatory sheet in the present invention makes it possible to provide a liquid-crystal display with a broadened viewing angle. The optical compensatory sheets that can be employed in a TN-mode LCD are described in JPA No. 1994-214116, U.S. Pat. No. 5,583,679 and No. 5,646,703, and German Patent No. 3911620A1. The optical compensatory sheets that can be employed in IPS and FLC-mode LCDs are described in JPA No. 1998-54982. The optical compensatory sheets that can be employed in OCB- and HAN-mode LCDs are described in U.S. Pat. No. 5,805,253 and WO96/37804. The optical compensatory sheets of the present invention that can be employed in a STN-mode LCD are described in JPA No. 1997-26572. The optical compensatory sheets that can be employed in a VA-mode LCD are described in JP Patent No. 2866372.

The optical compensatory sheets for LCDs of various modes may be prepared based on descriptions above. The optical compensatory sheets of the present invention may be combined with liquid-crystal cells driven by various modes such as TN (Twisted Nematic), IPS (In-Plane Switching), FLC (Ferroelectric Liquid Crystal), OCB (Optical compensatory Bend), STN (Supper Twisted Nematic), VA (Vertically Aligned), and HAN (Hybrid Aligned Nematic) modes; and employed in various liquid-crystal displays. The optical compensatory sheet of the present invention is particularly effective in TN mode liquid-crystal displays.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1

A triacetyl cellulose film having a thickness of 100 micrometers and a size of 270 mm×100 mm, "FUJI TAC" manufactured by FUJI FILM, was used as a transparent substrate. A solution of alkyl-modified polyvinylalcohol, "MP-203" manufactured by KURARAY CO., LTD, was applied to the film in 0.5 micrometers, dried and its surface was subjected to rubbing treatment, to form an alignment layer. The coating liquid containing following components was applied to the alignment layer by a bar-coater.

| A Coating Solution for an optically anisotropic layer | |
|---|---|
| Compound (1) exemplified above | 0.10 wt parts |
| Retardation controlling agent (A) | 0.05 wt parts |
| 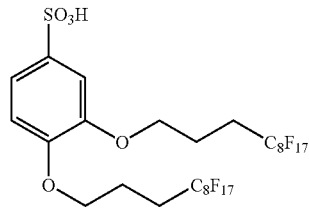 | |
| Discotic liquid crystal compound (B) | 100 wt parts |
| 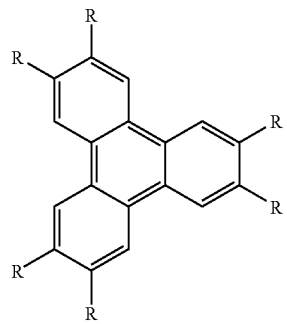 | |
| 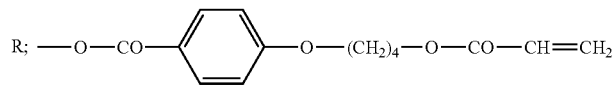 | |
| Ethylene oxide-modified trimethylol propane triacrylate (V#360 made by Osaka Organic Chemicals (Ltd.)) | 9.90 wt parts |
| Polymerization initiator (IRGACURE 907 made by Ciba-Geigy) | 3.30 wt parts |
| Methylethyl ketone | 300 wt parts |

The coated layer was heated up to 70 degrees Celsius for 10 seconds, and subsequently heated up to 125 degrees Celsius for 10 seconds, and then the alignment of molecules was maturated at the same temperature for 20 seconds. Subsequently, being irradiated with UV light of 2 J/m$^2$, the alignment was fixed. Thus the optically anisotropic layer was prepared and the optical compensatory sheet was obtained.

(Evaluation of Optical Compensatory Sheet)

Retardations of the obtained optical compensatory sheet were measured for various detection angles by an ellipsometer (APE-100 made by SHIMADZU CORPORATION). The wavelength for the measurement is 632.8 nm. The results are shown in Table 1.

Comparative Example 1

An optical compensatory sheet was prepared in the same manner as Example 1, except that Compound (1) was not added to the coating solution. And the obtained optical compensatory sheet was evaluated in the same manner as Example 1. The results are shown in Table 1.

Comparative Example 2

An optical compensatory sheet was prepared in the same manner as Example 1, except that neither Compound (1) nor Retardation controlling agent (A) were added to the coating solution. And the obtained optical compensatory sheet was evaluated in the same manner as Example 1. The results are shown in Table 1.

Comparative Examples 3 and 4

Optical compensatory sheets were respectively prepared in the same manner as Example 1, except that Compound (416) exemplified in JPA No. 2001-166144 and Compound (18) exemplified in JPA No. 2002-20363 were respectively used by the same amount as Compound (1) in the place of Compound (1). And the obtained optical compensatory sheets were evaluated in the same manner as Example 1. The results are shown in Table 1.

Compound (416) exemplified in JPA No. 2001-166144:

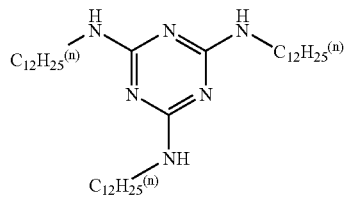

Compound (18) exemplified in JPA no. 2002-20363:

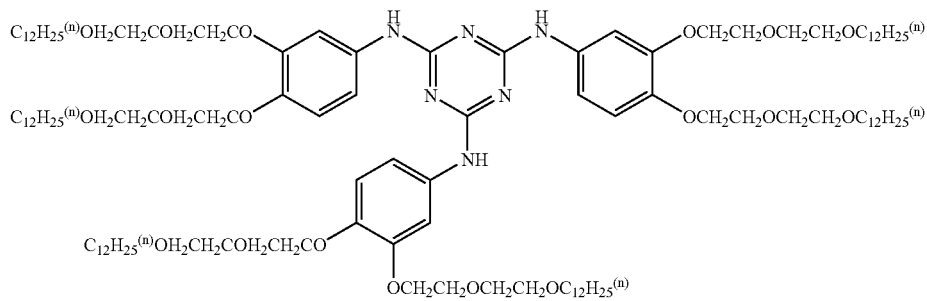

Examples 2 and 3

Optical compensatory sheets were respectively prepared in the same manner as Example 1, except that Compound (2) and Compound (3) were respectively used by the same amount as Compound (1) in the place of Compound (1). And the obtained optical compensatory sheets were evaluated in the same manner as Example 1. The results are shown in Table 1.

TABLE 1

| Optical compensatory Sheet | 1,3,5-triazine compound | Retardation (nm) (632.8 nm) |
|---|---|---|
| Comparative Example 1 | None | *1 |
| Comparative Example 2 | None | *1 |
| Comparative Example 3 | Compound (415) exemplified in JPA No. 2001-166144 | *1 |
| Comparative Example 4 | Compound (18) exemplified in JPA No. 2002-20363 | 23.4 |
| Example 1 | Compound (1) exemplified above | 40.8 |
| Example 2 | Compound (2) exemplified above | 40.5 |
| Example 3 | Compound (3) exemplified above | 41.0 |

*1 The value could not be measured due to schlieren defects.

When the discotic liquid crystal molecules were aligned without a 1,3,5-triazine compound represented by the Formula (I) the speed of alignment was slow. As a result, a lot of schlieren defects were found in the optically anisotropic layers of Comparative Example 1,2 and 3, not containing a 1,3,5-triazine compound represented by the Formula (I), and their retardations could not be measured.

When Compound (18) exemplified in JPA No. 2002-20363 was used, the speed of alignment was not slow. However, the retardation of the optically anisotropic layer of Comparative Example 4 was not within a desired range.

When the discotic liquid crystal molecules were aligned in the presence of a 1,3,5-triazine compound represented by the Formula (I), the speed of alignment was fast. And further the optically anisotropic layers of Example 1,2 and 3, containing a 1,3,5-triazine compound represented by the Formula (I), had a retardation within a desired range.

Example 4

The coated layer prepared in the same manner as Example 1 was heated up to 125 degrees Celsius for 20 seconds, and subsequently the alignment of molecules was maturated at the same temperature for 20 seconds. Subsequently, being irradiated with UV light of 2 J/m², the alignment was fixed. Thus the optically anisotropic layer, fixed at 250 degrees Celsius, was prepared and the optical compensatory sheet was obtained.

As well as the above example, the coated layer prepared in the same manner as Example 1 was heated up to 125 degrees Celsius for 20 seconds, and subsequently the alignment of molecules was maturated at the same temperature for 20 seconds. And then the coated layer was cooled down to 80 degrees Celsius for 20 seconds, and subsequently, being irradiated with UV light of 2 J/m² at the same temperature, the alignment was fixed. Thus the optically anisotropic layer, fixed at 80 degrees Celsius, was prepared and the optical compensatory sheet was obtained.

(Evaluation of Optical Compensatory Sheet)

Retardations of the obtained optical compensatory sheet were measured for various detection angles by an ellipsometer (APE-100 made by SHIMADZU CORPORATION). The wavelength for the measurement is 632.8 nm. The results are shown in Table 2.

Comparative Example 5

Two optical compensatory sheets were prepared in the same manner as Example 4, except that Compound (1) was not added to the coating solution. And the obtained optical compensatory sheets were evaluated in the same manner as Example 1. The results are shown in Table 2.

Comparative Example 6

Two optical compensatory sheets were prepared in the same manner as Example 4, except that neither Compound (1) nor Retardation controlling agent (A) were added to the coating solution. And the obtained optical compensatory sheets were evaluated in the same manner as Example 1. The results are shown in Table 2.

Comparative Examples 7 and 8

Optical compensatory sheets were respectively prepared in the same manner as Example 4, except that Compound (416) exemplified in JPA No. 2001-166144 and Compound (18) exemplified in JPA No. 2002-20363 were respectively used by the same amount as Compound (1) in the place of Compound (1). And the obtained optical compensatory sheets were evaluated in the same manner as Example 1. The results are shown in Table 2.

Examples 5 and 6

Optical compensatory sheets were respectively prepared in the same manner as Example 4, except that Compound (2) and Compound (3) were respectively used by the same amount as Compound (1) in the place of Compound (1). And the obtained optical compensatory sheets were evaluated in the same manner as Example 1. The results are shown in Table 2.

TABLE 2

| Optical compensatory Sheet | 1,3,5-triazine Compound | Retardation*2 (nm) (632.8 nm) | Retardation*3 (nm) (632.8 nm) |
|---|---|---|---|
| Comparative Example 5 | None | *1 | *1 |
| Comparative Example 6 | None | *1 | *1 |
| Comparative Example 7 | Compound (415) exemplified in JPA No. 2001-166144 | *1 | *1 |
| Comparative Example 8 | Compound (18) exemplified in JPA No. 2002-20363 | 24.1 | 18.3 |
| Example 4 | Compound (1) exemplified above | 40.6 | 40.0 |
| Example 5 | Compound (2) exemplified above | 40.7 | 40.1 |
| Example 6 | Compound (3) exemplified above | 41.1 | 40.3 |

*1 The value could not be measured due to schlieren defects.
*2 Retardation of a layer which was produced by fixing LC molecules in an alignment state at 125 degrees Celsius.
*3 Retardation of a layer which was produced by fixing LC molecules in an alignment state at 80 degrees Celsius.

When the discotic liquid crystal molecules were aligned without a 1,3,5-triazine compound represented by the Formula (I) the speed of alignment was slow. As a result, a lot of schlieren defects were found in the optically anisotropic layers of Comparative Example 5, 6 and 7, not containing a 1,3,5-triazine compound represented by the Formula (I), and their retardations could not be measured.

When Compound (18) exemplified in JPA No. 2002-20363 was used in comparative Example 8, the retardation of the optically anisotropic layer was not within a desired range. And further the retardation of the optically anisotropic layer fixed at 80 degrees Celsius was smaller than that of the optically anisotropic layer fixed at 250 degrees Celsius. This result shows that the retardation of the layer, not containing a 1,3,5-triazine compound represented by the Formula (I), varied with temperature in the fixing step.

When the discotic liquid crystal molecules were aligned in the presence of a 1,3,5-triazine compound represented by the Formula (I), the speed of alignment was fast. And further the optically anisotropic layers of Example 4, 5 and 6, containing a 1,3,5-triazine compound represented by the Formula (I), did not vary with temperature in the fixing step. Such optically anisotropic layers are desirable.

Next, examples of liquid crystal displays are shown below.

Example 7

(Preparation of a Transparent Substrate)

The following ingredients were poured in a mixing tank and stirred under heating to prepare a cellulose acetate solution (dope).

| Composition of cellulose acetate solution | |
|---|---|
| Cellulose acetate with a 60.9 percent degree of acetation | 100 wt parts |
| Triphenyl phosphate | 6.5 wt parts |
| Biphenyldiphenyl phosphate | 5.2 wt parts |
| Retardation enhancer (1) described below | 0.1 wt parts |
| Retardation enhancer (2) described below | 0.2 wt parts |
| Methylene chloride | 310.25 wt parts |
| Methanol | 54.75 wt parts |
| 1-Butanol | 10.95 wt parts |

Retardation enhancer (1)

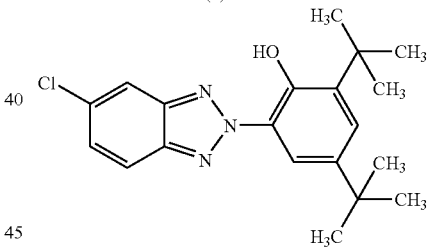

Retardation enhancer (2)

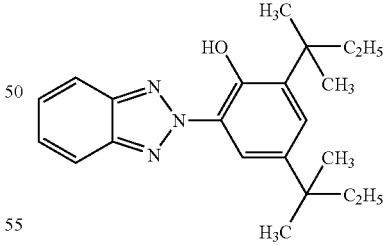

The dope obtained was made to flow out of a nozzle onto a drum cooled to 0 degrees Celsius. It was peeled off while having a solvent content of 70 weight percent, the two edges of the film in the transverse direction were fixed with a pin tenter, and in the area where the solvent content was from 3 to 5 weight percent, the film was dried while maintaining a spacing yielding a stretching rate of 3 percent in the traverse direction (direction perpendicular to the machine direction). Subsequently, the film was further dried by passing it between the rolls of a heat treatment device and adjusted to achieve a ratio between the stretching rate in the transverse direction and the stretching rate in the machine direction of 0.75 with an essentially 0 percent stretching rate in the machine direction in the area in which the glass transition temperature exceeded 120 degrees Celsius (taking into account 4 percent stretching in the machine direction during separation). This yielded a cellulose acetate film 100 micrometers thick. Measurement of the retardation of the film thus prepared at a wavelength of 632.8 nm revealed a thickness retardation of 40 nm and an in-plane retardation of 4 nm. The cellulose acetate film thus prepared was employed as transparent substrate.

(Preparation of a First Undercoating Layer)

A coating liquid of the composition indicated below was applied in 28 ml/m² to the transparent substrate and dried to form a first undercoating layer.

| Composition of first undercoating layer coating liquid | |
|---|---|
| Gelatin | 5.42 wt parts |
| Formaldehyde | 1.36 wt parts |
| Salicylic acid | 1.60 wt parts |
| Acetone | 391 wt parts |
| Methanol | 158 wt parts |
| Methylene chloride | 406 wt parts |
| Water | 12 wt parts |

(Preparation of a Second Undercoating Layer)

A coating liquid of the composition indicated below was applied in 7 ml/m² to the first undercoating layer and dried to form a second undercoating layer.

| Composition of second undercoating layer coating liquid | |
|---|---|
| Anionic polymer described below | 0.79 wt part |
| Citric acid monoethyl ester | 10.1 wt parts |
| Acetone | 200 wt parts |
| Methanol | 877 wt parts |
| Water | 40.5 wt parts |

Anionic polymer (1)

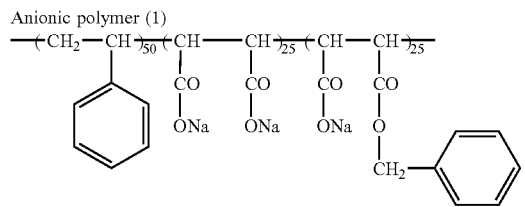

(Preparation of a Back Layer)

A coating liquid of the composition indicated below was applied in 25 ml/m² to the opposite surface of the transparent substrate and dried to form a back layer.

| Composition of back layer coating liquid | |
|---|---|
| Cellulose diacetate with 55 percent degree of acetation | 6.56 wt parts |
| Silica-based matting agent (average particle size: 1 micrometer) | 0.65 wt parts |
| Acetone | 679 wt parts |
| Methanol | 104 wt parts |

(Preparation of an Alignment Layer)

An aqueous solution of alkyl-modified polyvinyl alcohol was applied to the second undercoating layer and dried for 90 sec with 60 degrees Celsius hot air, and then a rubbing treatment was applied to form an alignment layer. The rubbing direction of the alignment layer was parallel to the flow direction of the transparent substrate.

(Preparation of an Optically Anisotropic Layer)

The coating solution used for preparation of the optically anisotropic layer of Example 1 was applied with a #4 wire bar to the alignment layer. The thickness of the optically anisotropic layer was 1.74 micrometers.

The coated layer was heated up to 125 degrees Celsius for about 30 sec in a thermostatic chamber of 130 degrees Celsius and subsequently cooled down to 80 degrees Celsius for 30 sec to align discotic liquid crystal molecules. After that, being irradiated with UV light of 120 w/cm high-pressure mercury lamp for 1 minute thereby to polymerize liquid crystal molecules and fix the alignment. Being cooled to room temperature, an optical compensatory sheet having an optically anisotropic layer thereon was obtained.

(Preparation of Liquid-crystal Display)

A polyimide alignment layer was provided on a glass substrate equipped with transparent ITO electrodes and treated by rubbing. Five micrometer spacers were positioned and two such sheets of substrate were positioned with their alignment layers facing. The two substrates were positioned so that the rubbing directions of their alignment layers were perpendicular. Rod-shaped liquid-crystal molecules (ZL4792 made by Merck Co.) were poured into the gap between the substrates to form a rod-shaped liquid-crystal layer. The Δn of the rod-shaped liquid-crystal molecules was 0.0969. Two optical compensatory sheets prepared as set forth above were bonded to either side of the TN liquid-crystal cell prepared as set forth above so that the optically anisotropic surfaces faced the substrates of the liquid-crystal cell. Two polarizing plates were then bonded to the outside thereof to prepare a liquid crystal display. The arrangement was such that the rubbing direction of the alignment layer of the optical compensatory sheet was antiparallel to the rubbing direction of the alignment layer of the liquid-crystal cell adjacent thereto. Further, the arrangement was such that the absorption axis of the polarizing plate was parallel to the rubbing direction of the liquid-crystal cell. A voltage was applied to the liquid-crystal cell of the liquid-crystal display, the transmittance of a 2 V white display and a 5 V black display was adopted as the contrast ratio, a contrast ratio of 10 was measured vertically and horizontally, and the area without gradation reversal was measured as the viewing angle. The results are given in Table 3.

Comparative Example 9

A LCD was produced in the same manner as Example 7, except that Compound (1) was not added to the coating solution. The obtained LCD was evaluated in the same manner as Example 7. The results are shown in Table 3.

Comparative Example 10

A LCD was produced in the same manner as Example 7, except that neither Compound (1) nor Retardation controlling agent (A) were added to the coating solution. The obtained LCD was evaluated in the same manner as Example 7. The results are shown in Table 3.

Referential Example 1

A LCD was produced in the same manner as Example 7, except that Compound (1) was not added to the coating solution, and conditions in the alignment step were changed as follows:

The coated layer was heated for 3 minutes in a thermostatic chamber of 130 degrees Celsius to align discotic liquid crystal molecules, was subsequently was irradiated with UV light of 120 w/cm high-pressure mercury lamp for 1 minute to polymerize liquid crystal molecules and to fix the alignment. The obtained LCD was evaluated in the same manner as Example 7. The results are shown in Table 3.

TABLE 3

| Optical compensatory Sheet | 1,3,5-triazine Compound | Viewing Angle (Vertical direction) | Viewing Angle (Horizontal direction) |
|---|---|---|---|
| Example 7 | Compound (1) | 91 degree | 148 degree |
| Comparative Example 9 | None | *1 | *1 |
| Comparative Example 10 | None | *1 | *1 |
| Referential Example 1 | None | 91 degree | 148 degree |

*1 The value could not be measured due to schlieren defects.

As shown in Table 3, the optical compensatory sheet prepared in Example 7, having an optically anisotropic layer in which discotic liquid crystal molecules were aligned in hybrid alignment, contributed to broadening viewing angle of the LCD. And shlieren defects, which were found in optically anisotropic layers prepared in Comparative Example 9 and 10, were not found in the optically anisotropic layer prepared in Example 7, and discotic liquid crystal molecules were mono-domain aligned in the optically anisotropic layer prepared in Example 7. And discotic liquid crystal molecules were hybrid-aligned in shorter time in Example 7 than that required in Referential Example 1.

According to the present invention, techniques capable of rapidly preparing optically anisotropic layers formed of hybrid aligned liquid crystal compounds without defects such as schlieren defects can be provided. And optical compensatory sheets having optically anisotropic layers which can be produced rapidly in high productivity can be also provided. And optical compensatory sheets which can contribute to broadening the viewing angle of liquid crystal displays (LCD) and LCDs improved in viewing angle can be provided.

What is claimed is:

1. An optical compensatory sheet comprising
a transparent substrate and
an optically anisotropic layer comprising at least one compound selected from the group represented by Formula (II):

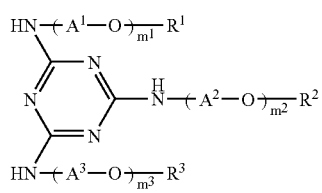

where $A^1$, $A^2$ and $A^3$ respectively represent an alkylene group; $R^1$, $R^2$ and $R^3$ respectively represent a substituted or non-substituted alkyl group or a substituted or non-substituted aryl group; and $m^1$, $m^2$ and $m^3$ respectively represent an integer from 1 to 10, and when $m^1$, $m^2$ and $m^3$ are respectively not less than 2, plural $A^1$, $A^2$ or $A^3$ may be same as or different from each other; and the optically anisotropic layer further comprises liquid crystal molecules fixed in hybrid alignment.

2. The optical compensatory sheet of claim 1, wherein the liquid crystal molecules are selected from discotic liquid crystals.

3. The optical compensatory sheet of claim 1, wherein $R^1$, $R^2$ and $R^3$ respectively represent a substituted or non-substituted alkyl group.

4. The optical compensatory sheet of claim 1, wherein $R^1$, $R^2$ and $R^3$ respectively represent a $C_{1-30}$ substituted or non-substituted alkyl group.

5. The optical compensatory sheet of claim 1, wherein the transparent substrate is a polymer film of cellulose acetate.

6. An elliptical polarizing plate comprising
a transparent substrate,
an optically anisotropic layer comprising at least one compound selected from the group represented by Formula (II):

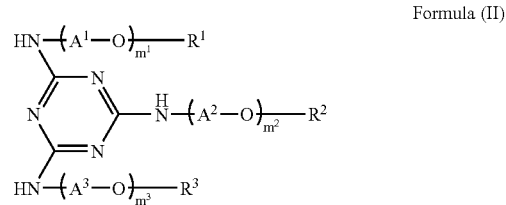

where $A^1$, $A^2$ and $A^3$ respectively represent an alkylene group; $R^1$, $R^2$ and $R^3$ respectively represent a substituted or non-substituted alkyl group or a substituted or non-substituted aryl group: and $m^1$, $m^2$ and $m^3$ respectively represent an integer from 1 to 10, and when $m^1$, $m^2$ and $m^3$ are respectively not less than 2, plural $A^1$, $A^2$ or $A^3$ may be same as or different from each other; and the optically anisotropic layer further comprises liquid crystal molecules fixed in hybrid alignment; and
a polarizing film disposed nearer to the optically anisotropic layer than to the transparent substrate.

7. A liquid crystal display comprising
a pair of polarizing films,
a liquid crystal cell which is disposed between the polarizing films, and
at least one optically anisotropic layer comprising at least one compound selected from the group represented by Formula (II):

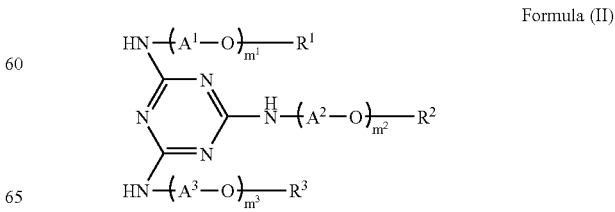

where $A^1$, $A^2$ and $A^3$ respectively represent an alkylene group; $R^1$, $R^2$ and R3 respectively represent a substituted or non-substituted alkyl group or a substituted or non-substituted aryl group; and $m^1$, $m^2$ and $m^3$ respectively represent an integer from 1 to 10, and when $m^1$, $m^2$ and $m^3$ are respectively not less than 2, plural $A^1$, $A^2$ or $A^3$ may be same as or different from each; and the at least one optically anisotropic layer further comprises liquid crystal molecules fixed in hybrid alignment;

wherein the at least one optically anisotropic layer is disposed between the liquid crystal cell and at least one of the pair of polarizing films.

8. The liquid crystal display of claim 7, wherein the liquid crystal cell is driven in TN-mode.

9. The optical compensatory sheet of claim 1, wherein $R^1$, $R^2$ and R3 respectively represent a non-substituted alkyl group.

10. The optical compensatory sheet of claim 1, wherein $R^1$, $R^2$ and $R^3$ respectively represent a $C_{1-30}$ non-substituted alkyl group.

11. The optical compensatory sheet of claim 1, wherein $R^1$, $R^2$ and $R^3$ respectively represent a $C_{3-30}$ non-substituted alkyl group.

* * * * *